D. BALACHOWSKY & P. CAIRE.
SPEED CONTROLLING DEVICE APPLICABLE TO ELECTRIC MOTORS AND GENERATORS.
APPLICATION FILED MAY 8, 1907.
960,774.
Patented June 7, 1910.
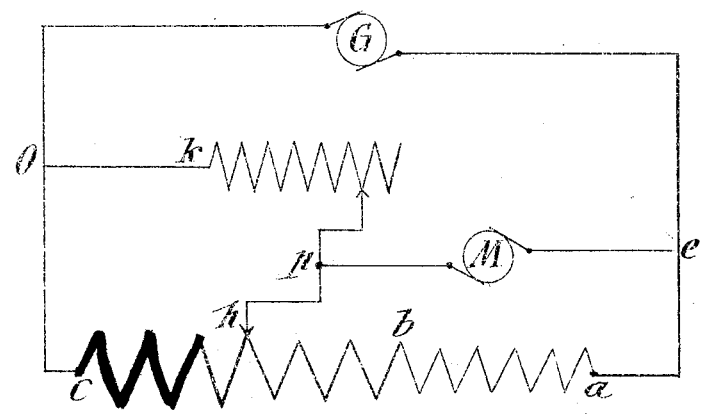

UNITED STATES PATENT OFFICE.

DMITRY BALACHOWSKY, OF PARIS, AND PHILIPPE CAIRE, OF LEVALLOIS-PARIS, FRANCE.

SPEED-CONTROLLING DEVICE APPLICABLE TO ELECTRIC MOTORS AND GENERATORS.

960,774.  Specification of Letters Patent.  Patented June 7, 1910.

Application filed May 8, 1907. Serial No. 372,577.

*To all whom it may concern:*

Be it known that we, DMITRY BALACHOWSKY, a subject of the Emperor of Russia, and resident of Paris, France, and PHILIPPE CAIRE, a citizen of the Republic of France, and resident of Levallois-Paris, France, have invented a new and useful Speed-Controlling Device Applicable to Electric Motors and Generators, which speed-controlling device is fully set forth in the following specification.

This invention relates to an improved device for regulating shunt-wound motors with the object of obtaining variation of speed or torque without varying the voltage of the feed current. This object is accomplished by employing a coil of varying cross-section to excite the field-magnets, and with a novel arrangement for varying the effective current in said coil. This arrangement is suitable also for varying the voltage of shunt-wound generators, and as the connections for the motor and the generator are the same, the connections are described only as applied to a motor.

In the drawing the figure is a diagrammatic representation of the regulator applied to a motor.

The field exciting coil $a\ c$ of the motor M is shunted across the feed wires of the generator G. This exciting coil comprises a portion $a\ b$ of fine wire and a portion $b\ c$ of thicker winding, preferably increasing in cross-section from $b$ to $c$.

The poles of the armature of the motor are connected to the feed wires from the generator at $e$ and $o$, but the portion $o\ k\ p$ of the connection between the motor and the point $o$ is made of variable resistance, as diagrammatically indicated. The point $p$ is connected by a movable contact $h$ to any point along the coil $b\ c$.

With the resistance of the portion $o\ k\ p$ constant and the contact $h$ at the point $c$, movement of the contact $h$ toward $b$ permits a portion of the motor-armature current to pass through the exciting coils between $c$ and $h$. As $h$ moves farther toward $b$, this portion of the armature current passes through more of the exciting coils increasing the field magnetism and, since the resistance of the coils $c\ b$ is not great, increasing the torque and decreasing the speed of the motor armature.

When the contact $h$ has reached the point $b$, the field magnetism may be further increased by increasing the resistance of the portion $o\ k\ p$ and thus diverting more of the motor-armature current through the coils $b\ c$.

The greatest field magnetization and the greatest armature torque occurs when the contact $h$ is at the point $b$ and the resistance of the portion $o\ k\ p$ is the maximum. The least field magnetization and highest motor-speed occurs when the contact $h$ is at the point $c$.

Having thus described our invention, we claim as new and desire to secure by Letters Patent:

1. In an electrical machine, the combination of an armature, an exciter winding of varied cross-section through which there is a continuous flow of current having a series of contact points, a branch contact to connect one pole of the armature with the exciter winding at any one of said points, and means for regulating the amount of current flowing through the thickest portion of the exciting winding comprising a variable resistance connected in parallel with said winding.

2. In an electrical machine, the combination of a pair of feed-wires, a field exciting winding having a finer winding at one end and a thicker winding of varied cross section at the other end provided with a series of contact points, an armature having one terminal connected to the feed wire to which said fine wire is connected, a conductor of variable resistance connecting the second terminal of the armature to the feed wire to which the thicker winding is connected, and a movable contact connecting said second terminal to any of said contact points of the thicker winding.

In testimony whereof we have signed this specification in the presence of two subscribing witnesses.

DMITRY BALACHOWSKY.
PHILIPPE CAIRE.

Witnesses:
EMILE LEDRET,
DEAN B. MASON.